(12) United States Patent
Metten et al.

(10) Patent No.: US 12,492,152 B2
(45) Date of Patent: Dec. 9, 2025

(54) METHOD FOR PRODUCING A PRINTED CONCRETE ELEMENT

(71) Applicants: METTEN Stein+Design GmbH & Co. KG, Overath (DE); NANO-X GmbH, Saarbrücken (DE)

(72) Inventors: Michael Metten, Bergisch Gladbach (DE); Guido Volmer, Erwitte (DE); Stefan Sepeur, Wadgassen (DE); Alexandra Muth, Bexbach (DE)

(73) Assignees: METTEN STEIN+DESIGN GMBH & CO. KG, Overath (DE); NANO-X GMBH, Saarbrucken (DE)

( * ) Notice: Subject to any disclaimer, the term of this patent is extended or adjusted under 35 U.S.C. 154(b) by 1032 days.

(21) Appl. No.: 16/617,708

(22) PCT Filed: Apr. 4, 2018

(86) PCT No.: PCT/EP2018/058551
§ 371 (c)(1),
(2) Date: Nov. 27, 2019

(87) PCT Pub. No.: WO2018/219525
PCT Pub. Date: Dec. 6, 2018

(65) Prior Publication Data
US 2020/0157012 A1 May 21, 2020

(30) Foreign Application Priority Data
Jun. 2, 2017 (DE) .............. 10 2017 005 280.8

(51) Int. Cl.
| | | |
|---|---|---|
| *C04B 41/00* | (2006.01) | |
| *B28B 11/04* | (2006.01) | |
| *B41M 5/00* | (2006.01) | |
| *C04B 14/06* | (2006.01) | |
| *C04B 28/02* | (2006.01) | |
| *C04B 41/45* | (2006.01) | |
| *C04B 41/48* | (2006.01) | |
| *C04B 41/49* | (2006.01) | |
| *C04B 41/52* | (2006.01) | |
| *C04B 41/64* | (2006.01) | |
| *C09D 11/32* | (2014.01) | |

(52) U.S. Cl.
CPC ............ *C04B 41/009* (2013.01); *B28B 11/04* (2013.01); *B41M 5/0023* (2013.01); *B41M 5/007* (2013.01); *C04B 14/06* (2013.01); *C04B 28/02* (2013.01); *C04B 41/4537* (2013.01); *C04B 41/4578* (2013.01); *C04B 41/483* (2013.01); *C04B 41/4884* (2013.01); *C04B 41/4961* (2013.01); *C04B 41/522* (2013.01); *C04B 41/64* (2013.01); *C09D 11/32* (2013.01)

(58) Field of Classification Search
CPC ... C04B 41/64; C04B 41/522; C04B 41/4961; C04B 41/4884; C04B 41/482; C04B 41/4578; C04B 41/4537; C04B 41/009
See application file for complete search history.

(56) References Cited

U.S. PATENT DOCUMENTS

| | | | | |
|---|---|---|---|---|
| 7,893,183 | B2 * | 2/2011 | Lejeune | ................ C08G 77/14 |
| | | | | 528/21 |
| 9,120,961 | B2 | 9/2015 | Li et al. | |
| 10,487,231 | B2 * | 11/2019 | Roggers | ..................... B41J 2/01 |
| 2018/0037514 | A1 * | 2/2018 | Chowdhury | ........... C09D 11/30 |
| 2018/0215673 | A1 | 8/2018 | Agnely et al. | |

FOREIGN PATENT DOCUMENTS

| | | |
|---|---|---|
| CA | 2978662 A1 | 9/2016 |
| DE | 102006014900 | 12/2007 |
| EP | 3515999 | 7/2019 |
| JP | 2007-038416 | 2/2007 |
| WO | 2016/134728 | 9/2016 |
| WO | 2017/021284 | 2/2017 |
| WO | 2018058122 A1 | 3/2018 |

OTHER PUBLICATIONS

Srinivasan et al. Geopolymer Binders: A Need for Future Concrete Construction, ISRN Polymer Science, vol. 2013, Article ID 509185, 8 pages. (Year: 2013).*
International Search Report for PCT/EP2018/058551 mailed Jun. 18, 2018.
Written Opinion of the International Searching Authority for PCT/EP2018/058551 mailed Jun. 18, 2018.

* cited by examiner

*Primary Examiner* — Kelly M Gambetta
(74) *Attorney, Agent, or Firm* — Honigman LLP; Andrew N. Weber; Jonathan P. O'Brien

(57) ABSTRACT

A method for producing a printed concrete element, in particular a printed concrete block, a printed concrete slab or a printed concrete step, is described, comprising at least the following steps:
 filling concrete into a mold to form a concrete element;
 printing at least one surface area of the concrete element with a printing composition comprising a binder A and a dye B, the binder A containing at least one siloxane and at least one silane; and
 curing the concrete element after printing.

31 Claims, No Drawings

METHOD FOR PRODUCING A PRINTED CONCRETE ELEMENT

The invention relates to a printed concrete element, to a concrete element and to a method for producing the printed concrete element.

The diverse design of concrete elements makes it possible to use the building material concrete for demanding construction projects and aesthetically pleasing surfaces. In particular, the color design and printing of concrete elements has proven to be a useful technique for the design of concrete. However, a variety of challenges in the design of concrete elements must be considered, such as the difficulty of achieving good adhesion of materials to the concrete. In addition, in the design of the concrete the problem arises that the already cured concrete is difficult to design, but many materials cannot be applied beforehand because they are not compatible with the conditions of curing the concrete.

The known methods for printing concrete elements are based primarily on what is known as the dry printing method. In this case, after the concrete is cured, the concrete element is printed with a material. Patterns can therefore be applied to the concrete and color designs of the concrete element are also possible in this way.

However, printing as yet uncured wet concrete would be of particular interest because the printing compositions can, due to flowing, create patterns and structures in the concrete that cannot be obtained by the dry printing method. In this case, however, the printing compositions would have to meet a number of conditions. They would have to flow to the correct extent in the horizontal and/or vertical direction in the concrete to produce the desired patterns. At the same time, they would have to have good adhesion to the cured concrete and be compatible with the conditions of curing the concrete.

DE 10 2006 014 900 A1 describes a wet printing method for concrete elements. The concrete product described therein has a printing embedded in the concrete on a visible side. The printing is produced on the wet concrete, which has not yet set or has set in part at most. However, DE 10 2006 014 900 A1 does not address the exact printing composition and does not concern the flowing of the printing composition on the wet concrete. The desired flowing patterns therefore cannot be obtained on and/or in the concrete. Furthermore, the document does not address the problem of the adhesion of the material to the cured concrete and the properties that must be satisfied by the printing composition so that the printing composition does not lose the desired structure upon thermal curing of the concrete element.

The object of the present invention is therefore to provide a method for producing a printed concrete element in which a concrete element is printed with a printing composition before curing of the concrete element, wherein the printing composition flows in the horizontal and/or vertical direction with respect to the surface in the concrete, adheres well to the concrete, and is compatible with the conditions of curing, in particular thermal curing, of the concrete.

This object is achieved by the method described herein and the products described herein.

Advantageous embodiments of the invention are specified in the dependent claims and are explained in detail below, as is the general inventive concept.

The method according to the invention for producing a printed concrete element, in particular a printed concrete block, a printed concrete slab or a printed concrete step, comprises at least the following steps:

filling concrete into a mold to form a concrete element;

printing at least one surface area of the concrete element with a printing composition comprising a binder A and a dye B, the binder A containing at least one siloxane and at least one silane; and curing the concrete element after printing.

Surprisingly, it has been found that the particular challenges of a printing composition for printing as yet uncured concrete are satisfied by a printing composition comprising a binder A and a dye B, the binder A containing a siloxane and a silane. If at least one surface area of the concrete element is printed with the described printing composition, the flowing of the printing composition in the horizontal and/or vertical direction with respect to the surface in the concrete results in various shaping patterns which adhere well to the concrete even after the subsequent curing of the concrete and are not damaged by the process of curing.

Printing on a wet, as yet uncured concrete element with a printing composition comprising a binder A and a dye B, the binder containing at least one siloxane and at least one silane, allows access to new patterns and structures on and/or in the concrete which were not accessible using the previously existing methods. Due to the specific composition of siloxane and silane in binder A, the printing composition in the wet concrete flows to exactly the right extent to produce interesting patterns. The silane gels during the subsequent curing of the concrete and ensures the excellent adhesion of the material to the concrete. In contrast to other materials tested, the binder A used in the method according to the invention is characterized by excellent heat resistance, which is why the pattern applied in the wet concrete element also withstands a thermal curing step well.

The method according to the invention can therefore allow a large number of new structures and patterns on a concrete element. For printing the concrete element with the printing composition, a variety of different printing methods can be used. Possible printing methods include inkjet printing, screen printing, powder coating, laser printing, dot matrix, electrostatic, liquid printing and/or pad printing methods. Different printing methods can also be combined. The inkjet printing method has been found to be particularly preferred, especially since it is cheap and widely used. It is of course possible to use other printing methods for printing the concrete element with the printing composition.

The binder A has proven to be of particular importance for the method according to the invention. The binder A comprises at least two components, one component being a siloxane and another component being a silane. The siloxane is preferably a silicone resin, in particular a condensed, pre-crosslinked silicone resin. Condensed, pre-crosslinked silicone resins have the correct properties to give the printing composition the necessary stability and flowability. The binder A is preferably an organic-inorganic binder.

The binder A preferably contains, as a component, a condensed, pre-crosslinked silicone resin having an inorganic proportion of preferably from 50 to 85% and/or a preferred condensation rate of from 30 to 90%, particularly preferably from 70 to 90%. The silicone resin is preferably a methyl, methyl/phenyl or phenyl silicone resin. Mixtures of different silicone resins, in particular mixtures of the aforementioned silicone resins, are also considered.

The binder A contains a silane as a further component. The silane is preferably selected from monomers of the composition $(R)_a$—Si—$(OR)_b$ with a=0, 1 or 2 and b=2, 3 or 4. In this case, R may preferably be an unsubstituted or substituted organic side chain of the composition methyl (Me), ethyl (Et), propyl (Pr) and/or phenyl (Ph). The silane is particularly preferably selected from Me-Si(OEt)$_3$, Pr—

Si—(OEt)$_3$, Ph-Si—(OMe)$_3$, Me$_2$Si—(OMe)$_2$ and Si(OEt)$_4$. Mixtures of different silanes, in particular mixtures of the aforementioned silanes, are also considered.

The binder A according to the invention can have very broad mixing ratios of the two components, siloxane and silane. In particular, the binder A mixture may preferably contain siloxane and silane in a mass ratio of from 10:90 to 90:10, more preferably from 50:50 to 80:20. More preferably, the mass ratios of siloxane and silane in the binder A are from approximately 75:25, approximately 70:30, approximately 65:35, approximately 60:40 and approximately 55:45.

The binder A according to the invention can be diluted by means of solvents. Preferably, the solvents are selected from a group consisting of water, alcohols, esters, special boiling-point spirits, aromatic solvents, and mixtures thereof. Preferred dilutions of the binder in the solvents have a solids content of from 10 to 100 wt. %, more preferably from 40 to 80 wt. %, particularly preferably from 60 to 80 wt. %, measured according to DIN EN ISO 3251:2008.

For the method according to the invention, various dyes can be used as the dye B. Dye B may therefore preferably be selected from inorganic and organic dyes and/or pigments, in particular from carbon blacks, iron oxides, fluorescent dyes, IR-absorbing dyes, UV-reflecting dyes, electrically conductive pigments, electrically insulating pigments and magnetic fillers. Particularly preferably, dye B is selected from inorganic dyes and/or pigments such as iron oxide pigments (red, yellow, black), cobalt oxide pigments (blue, green) and/or titanium oxide pigments (white).

Another characteristic of the printing composition used in the method according to the invention is that the use of a curing catalyst is optional. Other printing compositions often require large quantities of curing catalysts. Since in the method according to the invention the printing composition is applied to the fresh concrete before curing, the alkaline medium contained in the concrete can serve as a catalyst for the curing of the printing composition. However, there may be cases in which it is expedient for the printing composition to further contain a curing catalyst C. The curing catalyst C is preferably selected from the group consisting of phosphoric acid, phosphoric acid esters, phosphoric acid diesters, phosphonic acid, phosphonic acid esters, phosphonic acid diesters, metal alkoxides including aluminum, titanium and zirconium alkoxides, amines and aminosilanes. The curing catalyst C can be used in relatively small amounts, preferably in an amount of from 0.5 to 20 wt. %, particularly preferably in an amount of from 2.5 to 10 wt. %, based on the total weight of the printing composition.

The method according to the invention may comprise further method steps in addition to the method steps already described. Preferably, the concrete is compressed after filling into the mold, in particular by means of vibration and/or by means of a tamper. It is particularly advantageous if the concrete is compressed before printing. The compression ensures a uniform surface of the concrete and helps to expel air from the concrete.

According to one embodiment, the concrete is removed from the mold before printing. This method step is commonly referred to as "demolding." According to an alternative embodiment, the concrete can be removed from the mold even after printing. The demolding takes place particularly preferably after the concrete is compressed. A particularly preferred method sequence is therefore:

filling the concrete into a mold to form a concrete element;
compressing the concrete;
demolding the concrete element;
printing at least one surface area of the concrete element;
curing the concrete element after printing.

In a further preferred method step, the concrete is subjected to a structure-imparting surface treatment, preferably by brushing or embossing. The method for the treatment of surfaces from DE 100 54 581 A1 is preferably taken into consideration as such a structure-imparting surface treatment. The structure-imparting surface treatment takes place preferably after the concrete element is printed. More preferably, the structure-imparting surface treatment takes place before the concrete is cured. The structure-imparting surface treatment particularly preferably takes place after printing and before curing of the concrete. Owing to this sequence of method steps, synergistic design effects can be achieved between the printing and the structure-imparting surface treatment, since the structure-imparting surface treatment can have an influence on the already printed patterns and thus establish further patterns and designs of the concrete element.

The concrete to be poured into the mold can be any kind of concrete. According to a preferred embodiment of the method according to the invention, core concrete (raw concrete) is filled into the mold. In a further preferred embodiment, face concrete is filled into the mold. Particularly preferably, core concrete and face concrete are filled into the mold. When both core concrete and face concrete are filled into the mold, a preferred order of filling is to first fill the core concrete into the mold and then to fill the face concrete into the mold. As a result, the face concrete is on top of the more favorable core concrete and represents the visible surface of the concrete element. However, the order can also be reversed, for example if the concrete element is turned over before printing. Preferably, the printing of the concrete according to the invention takes place on the face concrete. As a result, particularly attractive concrete elements can be obtained. When both core concrete and face concrete are filled into the mold, the quantity ratios between the core concrete and the face concrete can be selected from a wide range. It is preferable if more core concrete is used than face concrete, as a more economical method is possible as a result.

The composition of the concrete to be printed is of particular importance for the method according to the invention. Particularly good results can be achieved if the concrete to be printed has a water-binder ratio (w/b ratio) of 0.30 to 0.50 at the time of printing. Experimental studies have shown that in particular concrete having a w/b ratio of 0.31 to 0.45, preferably 0.35 to 0.40, allows very good printing results. In particular, it has been found that a particularly good adhesive strength and homogeneous flow characteristics can be achieved with the printing composition used according to the invention if a concrete is used which has the aforementioned w/b ratios at the time of printing.

It has also been found that a particularly good printed image can be produced using the method according to the invention if a concrete is used of which the binder proportion is within a certain number range. According to a preferred embodiment of the invention, the binder proportion of the concrete to be printed is from 10 to 35 wt. %, more preferably 17.5 to 20.5 wt. %, based on the total composition of the concrete. These ranges apply in particular when cement is used as a binder. If geopolymer is used as binder, the binder proportion of the concrete to be printed is preferably 25 to 30 wt. % (solids component) and 2.5 wt. % to 6 wt. % activator liquid (preferably approximately 4.5 wt. %), based on the total composition of the concrete.

Preferably, the concrete to be printed contains an inorganic binder. Particularly preferred inorganic binders are selected from the group consisting of cement, alkali silicate-based binders (geopolymers), hydraulic lime, gypsum, and mixtures thereof.

The concrete to be printed preferably contains face concrete based on cement, a (crushed) sand gravel chippings mixture, and water. This face concrete is characterized by good mechanical properties and an attractive appearance. According to a preferred embodiment of the invention, the face concrete also contains color pigments, admixtures and/or additives to improve the processing or product properties. The selection of additives depends, inter alia, on other parameters of the method and on the desired use of the concrete element. Owing to the special composition of the face concrete and the optional color pigments, admixtures and/or additives to improve the processing or product properties, many differently printed and shaped concrete elements can be obtained using the method according to the invention.

For further protection of the surface of the concrete element, according to a preferred embodiment at least one cover layer D can be applied to the printed surface area of the concrete element after the concrete element is printed. The cover layer D can be applied before and/or after the concrete is cured. Depending on whether the cover layer is applied before or after the concrete is cured, the composition of said layer can vary. A thermal curing cover layer, for example, can be used as a cover layer which is applied before the concrete is cured. In contrast, a UV-curing cover layer, for example, is considered as a cover layer which is applied after the concrete is cured, as explained in more detail below.

According to a preferred embodiment of the invention, the cover layer D is a cover layer based on a water-based coating, in particular a water-based acrylate resin and/or polyurethane resin and/or epoxy resin. The water-based acrylate resins and/or polyurethane resins and/or epoxy resins are suitable for application to the printed concrete element before and/or after the concrete is cured, but are particularly suitable for application to the printed concrete element after the concrete is cured. The water-based acrylate resins and/or polyurethane resins and/or epoxy resins demonstrate particularly good protective and covering properties if they have a solids content of from 20 to 45 wt. %.

According to another preferred embodiment of the invention, the cover layer D is a cover layer based on a sol-gel coating, preferably a silicone resin/silane-based sol-gel coating. The sol-gel coating preferably has a relatively high solids content of from 60 to 100 wt. %. The sol-gel coating particularly preferably has a solids content of at least 80 wt. % (high-solid coating). The solids content of the sol-gel coating is preferably determined according to DIN EN ISO 3251:2008. In a further preferred embodiment of the invention, the sol-gel coating of the optional cover layer D is an aqueous emulsion. A cover layer based on a sol-gel coating is suitable for application to the printed concrete element before and/or after the concrete is cured, but is particularly suitable for application to the printed concrete element before the concrete is cured. If a cover layer based on a sol-gel coating is applied to the printed concrete element before the concrete is cured, then the sol-gel coating can also be cured itself when the concrete is cured. In this way, no further curing step is necessary. According to an alternative embodiment of the invention, a cover layer D, in particular a cover layer D based on a sol-gel coating, is also suitable as a primer (adhesion promoter) before the concrete is printed. For this purpose, the cover layer D can be applied to the surface of the as yet uncured concrete before printing. Optionally applying a cover layer D as a primer before printing can further improve the adhesion of the printing composition to the concrete.

The optional cover layer D is, according to a preferred embodiment, a cover layer based on a coating that is self-curing under the action of heat and/or electromagnetic radiation, in particular UV radiation. If the cover layer D is applied to the printed surface area of the concrete element after printing and before curing, this layer is, according to a preferred embodiment of the invention, a cover layer D based on a thermal curing coating. As a result, when the concrete is cured, the coating can be cured at the same time. If the cover layer D is applied to the printed surface area of the concrete element after curing, this layer is, according to a preferred embodiment of the invention, a cover layer D based on a coating that cures under the action of electromagnetic radiation, in particular UV radiation. The coating can be, for example, a water-based or non-water-based coating, in particular UV coating. If a non-water-based coating is used, it preferably has a solids content of 100 wt. %. Preferably, a "100% UV coating without solvent" is used. In this procedure, a cover layer D can be applied to the cured concrete element on the printed surface area and cured in a separate step by the influence of electromagnetic radiation, in particular UV radiation.

The optional cover layer D can be applied to the printed surface area of the concrete element in different ways. Preferred methods of applying the cover layer are the spraying, rolling or curtain coating methods.

The invention further provides a printed concrete element which can be obtained by a method comprising at least the following steps:

filling concrete into a mold to form a concrete element;
printing at least one surface area of the concrete element with a printing composition comprising a binder A and a dye B, the binder A containing at least one siloxane and at least one silane; and
curing the concrete element after printing.

The printed concrete element according to the invention is preferably a printed concrete block, a printed concrete slab or a printed concrete step.

The invention further provides a concrete element, in particular a concrete block, a concrete slab or a concrete step, which has, on at least one visible side, a printing embedded in the concrete, wherein the printing has been produced using a printing composition comprising a binder A and a dye B, and wherein the binder A contains a siloxane and a silane. The binder A and/or the dye B of the concrete element according to the invention are preferably as defined in any of the preceding paragraphs. According to a preferred embodiment of the invention, the printed visible side of the concrete element has at least one cover layer D. The at least one cover layer D of the concrete element according to the invention is preferably defined as in any of the preceding paragraphs.

The invention is explained in more detail in the following with reference to an embodiment, which is solely for the understanding of the invention and is not intended to limit said invention.

EXAMPLE

Raw concrete was poured into a mold for a paving stone. Subsequently, face concrete consisting of cement, a (crushing) sand gravel chippings mixture and water having a water-binder ratio (w/b ratio) of 0.35, a maximum grain size of 4 mm and a cement proportion in the face concrete layer of 19 wt. %, based on the total composition of the face concrete layer, is poured onto the core concrete and into the mold. Using a vibrating tamper method, the concrete was then compressed to form a paving stone and the concrete element was demolded from the mold immediately afterward. Immediately after demolding, the wet concrete was printed with an ink using an inkjet printer. The ink was prepared as follows:

30 g of Silres MSE100 (silicone resin; WACKER CHEMIE AG) and 30 g of Dynasil A (tetraethyl orthosilicate; EVONIK INDUSTRIES AG) were mixed and stirred for 10 minutes at room temperature. Subsequently, 18 g Bayferrox 306 black (dye; LANXESS AG), 3 g Silbond 6000 EST ($SiO_2$ powder; QUARZWERKE GmbH), 2.5 g 3-aminopropyltriethoxysilane, 0.18 g Tego Glide 410 (additive; TEGO/EVONIK INDUSTRIES AG) and 3 g Hordaphos MDAH (phosphoric acid ester; CLARIANT AG) were added to the mixture with stirring, and the whole mixture was stirred for 24 hours at room temperature. The obtained ink could be used directly afterward.

A printed image was produced by the wet concrete being printed with ink. The printed image was then provided with a clear coating based on a sol-gel mixture. The concrete element was cured at a temperature of from 25 to 30° C. for a period of 12 hours. Finally, a further clear coating layer based on an aqueous acrylate/polyurethane mixture was applied to the cured concrete element and cured under a UV lamp. The paving stone obtained in this way had a splitting tensile strength determined according to DIN EN 1338 of >2.6 MPa and, in the case of a plate, a bending tensile strength of >4.0 MPa and an abrasion resistance according to DIN EN 1338, Annex H of <18,000 $cm^3/5,000$ $mm^2$. Furthermore, the cured concrete layer of the paving stone had a density according to DIN EN 13369 of >2.25 $kg/m^3$. The printed image on the concrete element was completely preserved after curing of the concrete and coating.

The invention claimed is:

1. A method for producing a printed concrete element comprising the steps:
   (a) filling a mold with concrete to form a concrete element, the formation of which creating one or more surfaces of the concrete element;
   (b) printing at least one surface of the concrete element with a printing composition in a single step, the printing composition comprising a binder A and a dye B, wherein the binder A comprises at least one siloxane and at least one silane, wherein the siloxane is a condensed, pre-crosslinked silicone resin, and wherein the printing composition flows onto the surface of the concrete element at least partially in a vertical direction relative to an outer surface of the concrete element before curing of the concrete element; and
   (c) curing the concrete element after printing, wherein the at least one silane of the binder A gels while curing the concrete element to provide adhesion of the printing composition to the concrete element.

2. The method according to claim 1, wherein the printing is carried out using an inkjet, laser, dot matrix, or electrostatic printer.

3. The method according to claim 1, wherein step (b) comprises screen printing, liquid printing, or pad printing.

4. The method according to claim 1, wherein the condensed, pre-crosslinked silicone resin comprises 50 to 85% of an inorganic material.

5. The method according to claim 4, wherein binder A comprises a silane formed from one or more silane monomers of the formula (R)a—Si—(OR)b where a is 0, 1, or 2, b is 2, 3, or 4, and each R is independently selected from an unsubstituted or substituted methyl, ethyl, propyl, or phenyl.

6. The method according to claim 5, wherein the silane monomers are at least one selected from the group consisting of Me-Si—$(OEt)_3$, Pr—Si—$(OEt)_3$, Ph-Si—$(OMe)_3$, $Me_2Si$—$(OMe)_2$ and $Si(OEt)_4$.

7. The method according to claim 1, wherein binder A comprises silicone resin and silane in a mass ratio of from 10:90 to 90:10.

8. The method according to claim 1, wherein dye B is an organic dye or an inorganic dye.

9. The method according to claim 1, wherein the printing composition further comprises a curing catalyst C.

10. The method according to claim 9, wherein curing catalyst C is a phosphoric acid, a phosphoric acid ester, a phosphoric acid diester, a phosphonic acid, a phosphonic acid ester, a phosphonic acid diester, a metal alkoxide, an amine, or an aminosilane.

11. The method according to claim 10, wherein the printing composition comprises from 0.5 to 20 wt % of curing catalyst C based on the total weight of the printing composition.

12. The method according to claim 1, further comprising the step of compressing the concrete after the mold is filled with the concrete.

13. The method according to claim 12, wherein the concrete element is demolded before the printing step is carried out.

14. The method according to claim 13, wherein the concrete element is demolded after the concrete has been compressed.

15. The method according to claim 1, further comprising brushing or embossing at least a portion of a surface of the concrete after the printing step and prior to the curing step.

16. The method according to claim 1, wherein the mold is filed with core and face concrete.

17. The method according to claim 16, wherein the printing is carried out on the face concrete.

18. The method according to claim 17, wherein at least a portion of the face concrete has a water-binder ratio of 0.30 to 0.50 at the time of printing.

19. The method according to claim 18, wherein at least a portion of the face concrete comprises 10 to 35 wt % of a binder.

20. The method according to claim 19, wherein the binder in the face concrete comprises cement, an alkali silicate, hydraulic lime, or gypsum.

21. The method according to claim 1, wherein face concrete comprises cement, sand, gravel, and water.

22. The method according to claim 21, wherein the face concrete optionally comprises color pigments or other additives for improving the concrete properties.

23. The method according to claim 1, further comprising the step of applying at least one cover layer D onto the printed surface of the concrete before or after the curing step.

24. The method according to claim 23, wherein the cover layer D comprises a water-based acrylate resin, a water-based polyurethane resin, or a water-based epoxy resin.

25. The method according to claim 24, wherein the cover layer D further comprises a solids content from 20 to 45 wt %.

26. The method according to claim 23, wherein the cover layer D is a sol-gel coating based on silicone resin and/or silane.

27. The method according to claim 26, wherein the sol-gel coating has a solids content from 60 to 100 wt %.

28. The method according to claim 23, wherein the cover layer D cures upon exposure to heat or radiation.

29. The method according to claim 23, wherein the cover layer D cures upon exposure to heat or radiation and is applied to the printed surface of the concrete before the curing step.

30. The method according to claim 23, wherein the cover layer D is applied to the printed surface of the concrete by spraying, rolling, or curtain coating the printed surface of the concrete.

31. The method according to claim 1, wherein the printed concrete element is a printed concrete block, a printed concrete slab, or a printed concrete step.

* * * * *